US008406511B2

(12) United States Patent
Schlosser et al.

(10) Patent No.: US 8,406,511 B2
(45) Date of Patent: Mar. 26, 2013

(54) APPARATUS FOR EVALUATING IMAGES FROM A MULTI CAMERA SYSTEM, MULTI CAMERA SYSTEM AND PROCESS FOR EVALUATING

(75) Inventors: Markus Schlosser, Hannover (DE); Carsten Herpel, Wennigsen (DE)

(73) Assignee: Thomson Licensing, Boulogne-Billancourt (FR)

( * ) Notice: Subject to any disclaimer, the term of this patent is extended or adjusted under 35 U.S.C. 154(b) by 127 days.

(21) Appl. No.: 12/736,806

(22) PCT Filed: May 6, 2009

(86) PCT No.: PCT/EP2009/055496
§ 371 (c)(1),
(2), (4) Date: Nov. 10, 2010

(87) PCT Pub. No.: WO2009/138350
PCT Pub. Date: Nov. 19, 2009

(65) Prior Publication Data
US 2011/0064298 A1    Mar. 17, 2011

(30) Foreign Application Priority Data

May 14, 2008  (EP) ..................................... 08305166

(51) Int. Cl.
*G06K 9/00*  (2006.01)
(52) U.S. Cl. ...................................................... 382/154
(58) Field of Classification Search .................. 382/154; 345/419, 427; 356/12
See application file for complete search history.

(56) References Cited

U.S. PATENT DOCUMENTS 7,567,703 B2 *  7/2009  Jones et al. .................... 382/154

OTHER PUBLICATIONS

Zhang et al, "Reliability measurement of disparity estimates for intermediate view reconstruction", Jun. 2002, IEEE, vol. 3, pp. 837-840.*

(Continued)

*Primary Examiner* — Edward Park
(74) *Attorney, Agent, or Firm* — Robert D. Shedd; Robert B. Levy

(57) ABSTRACT

An apparatus for evaluating images from a multi camera system is proposed, the multi camera system comprising a main camera for generating a main image and at least two satellite cameras for generating at least a first and a second satellite image. The cameras can be orientated to a common observation area. The apparatus is operable to estimate a combined positional data of a point in the 3D-space. of the observation area corresponding to a pixel or group of pixels of interest of the main image. The apparatus comprises first disparity means for estimating at least a first disparity data concerning the pixel or group of pixels of interest derived from the main image and the first satellite image, second disparity means for estimating at least a second disparity data concerning the pixel or group of pixels of interest derived from the main image and the second satellite image, and positional data means for estimating the combined positional data of the point in the 3D-space of the observation area corresponding to the pixel or group of pixels of interest. The positional data means is operable to estimate first positional data on basis of the first disparity data and second positional data on basis of the second disparity data, and to combine the first positional data and the second positional data to the combined positional data.

14 Claims, 3 Drawing Sheets

OTHER PUBLICATIONS

Fua, "Reconstructing Complex Surfaces from Multiple Stereo Views", Computer Vision, 1995, Los Alamitos, CA, Jun. 20-23, 1995, pp. 1078-1085.

Goesele et al., "Multi-View Stereo Revisited", Computer Vision and pattern Recognition, 2006 IEEE Computer Society Conference, vol. 2, New York, New York, Jun. 17-22, 2006, pp. 2402-2409.

Tanger et al., "Trinocular Depth Acquisition", SMPTE Journal, vol. 116, No. 5, Scarsdale, NY, May 1, 2007, pp. 206-211.

Bradley et al., "Accurate Multi-View Reconstruction Using Robust Binocular Stereo and Surface Meshing", 26th IEEE Conference on Computer Vision and Pattern Recognition, CVPR 2008.

Search Report Dated Aug. 14, 2009.

* cited by examiner

APPARATUS FOR EVALUATING IMAGES FROM A MULTI CAMERA SYSTEM, MULTI CAMERA SYSTEM AND PROCESS FOR EVALUATING

This application claims the benefit, under 35 U.S.C. §365 of

International Application PCT/EP2009/055496, filed May 6, 2009, which was published in accordance with PCT Article 21(2) on Nov. 19, 2009 in English and which claims the benefit of European patent application No. 08305166.4, filed May 14, 2008.

The invention relates to an apparatus for evaluating images from a multi camera system, the multi camera system comprising a main camera for generating a main image and at least two satellite cameras for generating at least a first and a second satellite image, whereby the cameras can be orientated to a common observation area, wherein the apparatus is operable to estimate combined positional data of a point in the 3D-space of the observation area corresponding to a pixel of interest, or a group of pixels of interest, or block, of the main image, the apparatus comprising first disparity means for estimating at least a first disparity data concerning the interesting pixel derived from the main image and the first satellite image, second disparity means for estimating at least a second disparity data concerning the interesting pixel derived from the main image and the second satellite image and positional data means for estimating the combined positional data of the point in the 3D-space of the observation area corresponding to the pixel of interest, the group of pixels of interest, or block. The invention furthermore relates to a multi camera system comprising said apparatus and to a process for evaluating images.

Distance measurement with the help of video cameras is well-known in the art. A common approach is to use a so-called stereo camera system, which comprises two cameras being orientated to a common observation area. As the two cameras of the stereo camera system are arranged with some distance between them the images of the observation area differ slightly. This slight difference can be used to compute a so-called disparity between the two images. On basis of this disparity the distance or the 3D-position of an object point corresponding to the pixel in the images can be computed. In order to facilitate the search for corresponding image points in the two images of the two cameras, it is known to perform a rectification in a first step, whereby the two images are transformed in such a manner that the epipolar lines of the images are parallel to each other. In general the term rectification as used in the following specification also relates to calculating correction values for images for correcting image distortions, notably geometrical image distortions, due to the varying viewing angles of the cameras in the system. The geometrical distortions are also known as keystone distortions. The term rectification is, however, also used for calculations for correcting distortions originating from the camera itself, e.g. lens distortions, which may also be referred to by the term pincushion distortion, and shall not be construed to be limited to a single one of the calculations mentioned above.

It is furthermore known from the state of the art to use three cameras for distance measurement in order to improve the accuracy and the reliability of the resulting measurement values. From a theoretical point of view the evaluation of images from a multi camera system can be divided into an 'implicit method' and an 'explicit method'.

An approach for the 'implicit method' is described for example in the document US 2003/0072483 concerning a multi camera system with three cameras, whereby disparities are estimated jointly and consistently over all three cameras. For this purpose, triple point-correspondences between all three cameras respecting a trifocal constraint are tested against each other using an overall correlation criterion.

The 'explicit method' works the opposite way. The three cameras are separated into two independent camera pairs (e.g. middle-left and middle-right), and disparities are estimated completely independently from each other. An example for the 'explicit method' is disclosed by the document US 2006/0056727 A1. The document has the title "System for combining multiple disparity maps" and describes a process, whereby a plurality of images of a scene are provided, whereby pairs of images are selected and whereby for each pair of selected images a disparity map is created. In the next step, a reference point is selected and all disparity maps are transformed into the coordinates of the reference point. Afterwards the transformed disparity maps are merged into one single disparity map.

It is an object of the invention to present an apparatus, a multi camera system and a process improving the depth measurement in images of multi camera systems.

According to the invention an apparatus with the features of claim 1, a multi camera system with the features of claim 11 and a process with the features of claim 13 are proposed. Preferred or advantageous embodiments of the invention are disclosed in the dependent claims, in the description and/or in the figures as attached.

The apparatus according to the invention is adapted and/or operable to evaluate correlated images originating from a multi camera system. The apparatus itself can be embodied as a data processing unit, for example a computer running a corresponding computer program, a microcontroller, a dsp-card etc. The multi camera system comprises at least a main camera for generating a main image and at least two satellite cameras for generating at least a first and a second satellite image. In operation the cameras are orientated to observe a common observation area, so that the main image and the satellite images show at least partly overlapping areas. Although it may be preferred to use the said three cameras, it is also possible to use more than two satellite cameras accompanying the main camera.

The apparatus is operable and/or adapted to estimate a combined positional data of a point in the 3D-space of the observation area corresponding to a pixel of interest, the group of pixels of interest, or block of the main image. In the following description the point in the 3-D space may be referred to by any one or combination of the terms pixel of interest, group of pixels of interest, or block, without being limited to the term used, unless explicitly stated. It will be appreciated that any one of the terms relates to an object or point of interest located in the observation area, and the size of the object on the cameras' imagers determines whether it can be represented by one or more pixels, or a block of pixels. One task of the apparatus is thus to evaluate the images in such a way that combined positional data of the point in the 3D-space, for example 3D-coordinates or depth or distance values, corresponding to an interesting pixel of the main image, are calculated or estimated.

The apparatus comprises first disparity means for estimating at least a first disparity data concerning the interesting pixel derived from the main image and the first satellite image. Disparity in its general definition may be explained as a spatial difference between two corresponding image points, respectively representing the same original point, in two images from two cameras viewing the same or an overlapping observation area from different positions. From the respective positions of the corresponding points in the two images or on the basis of a corresponding disparity value it is possible to calculate the distance and/or the viewing angle to the object corresponding to the image points. In case the positions of the cameras are known the 3D-position of the object can be derived, otherwise the position is determined relative to the cameras.

Furthermore, the apparatus comprises second disparity means for estimating at least a second disparity data concerning the interesting pixel derived from the main image and the second satellite image. Preferably, the first disparity data and the second disparity data are calculated separately, especially without using the second satellite image in case of the first disparity data and without using the first satellite image in case of the second disparity data. In further embodiments of the invention third, fourth etc. disparity means can be integrated to evaluate images from third, fourth etc. satellite cameras in order to estimate third, fourth etc. disparity data.

A positional data means is operable and/or adapted to estimate or determine the combined positional data of the point in the 3D-space of the observation area corresponding to the interesting pixel from the positional data previously determined or estimated.

According to the invention, the positional data means is operable to estimate a first positional data on the basis of the first disparity information and a second positional data on the basis of the second disparity information and to combine the first positional data and the second positional data into the combined positional data. Preferably the estimation of the first positional data and the second positional data are performed separately, which means that the first positional data is estimated without using the second disparity information and the second positional data is estimated without using the first disparity data. Optionally third, fourth etc. positional data resulting from third fourth etc. disparity data may be used.

One finding of the invention is that the novel apparatus is able to determine the combined positional data with a high accuracy and high reliability. This advantage is based on the fact that the image information of the main image and the two satellite images are presented in some kind of a matrix-form or an equivalent thereof, due to the nature and finite resolution of the image sensor. As a result from the rectification performed when estimating the disparity data the input images are transformed into another matrix-form which does not necessarily fully coincide exactly with the matrix-form of the input images. In other words, the different viewing angles result in matrix distortions that have to be compensated for by rectification, even when the image resolution of the image sensors in terms of pixels per line and lines per image is the same. This may even be aggravated when the resolution of the image sensors differs. Thus, the disparity data may contain some interpolated values. In order to prevent a further transformation of the disparity data into a common disparity map as proposed by Jones et al. (US 20060056727) which is again realized as a matrix-form, it is proposed to virtually re-project the pixel of interest or group of pixels of interest from each camera into the 3-D space, or 'real world', based on the associated distance estimates, i.e. the disparity data, and combine the projected points to the point in the 3D-space corresponding to the pixel of interest or group of pixels of interest. As the image resolution in the 'real world' or the 3D-space is not limited by a matrix-form, one further interpolation step as required in Jones et al. can be avoided. Thus the resulting point in the 3D-space as determined in accordance with the invention has a higher accuracy and reliability compared to the results from apparatii or processes known from the prior art.

In a preferred embodiment of the invention the apparatus comprises a rectification means for performing the rectification of the main image with the first satellite image and—preferably separately—the main image with the second satellite image. As mentioned further above, the task of the rectification is to project multiple images onto a common image surface. It is for example used to correct a distorted image into a standard coordinate system. In one special embodiment the transformation is realized to align the epipolar lines of the images horizontally.

In a preferred and practical embodiment of the invention, the apparatus is operable to estimate a combined positional data map comprising the positional data of the pixel of interest or the group of pixels of interest. The map may comprise the complete main image, so that for every pixel or group of pixels in the main image a combined positional data is mapped. Alternatively, only a subset or subarea of the main image is mapped with combined positional data. Furthermore, it is preferred to estimate a first disparity map comprising the first disparity data and/or to estimate a second disparity map comprising the second disparity data. The dimension, for example the number of rows and number of columns, of the first disparity map, and the second disparity map and the combined positional data map are preferably the same.

In a further preferred embodiment of the invention at least one, some or each of the first disparity data comprises at least two, preferably four neighbor disparity data values for each pixel of interest or group of pixels of interest in the original image. Four neighbor disparity values may represent a tradeoff between required computing power and accuracy. Additionally or alternatively, for at least one, some or each of the second disparity data at least two, preferably four neighbor disparity data values are provided. As explained before, the transformation from the input images into the disparity maps usually leads to an interpolation, at least for parts of the image, as the input images are embodied in matrix-form and the disparity maps are also embodied in matrix-form, but having a different matrix due to geometrical distortion or the like. In order to minimize the transformation and/or interpolation inaccuracies it is preferred to provide not only one single disparity data value per disparity map but at least two for the pixel of interest or group of pixels of interest. Preferably four disparity data values resulting from matrix places located adjacent to the ideal position of the pixel of interest or group of pixels of interest in the disparity map are provided. With the knowledge that the ideal position of the interesting pixel in the disparity maps is located between the matrix places corresponding to the two, preferably four neighbor disparity data values ideally no, or at least only a minimum of information is lost by the transformation. With this embodiment, sub-pixel accuracy can be achieved.

Consequently, it is preferred, that each of the first and/or the second positional data comprises at least two, preferably four positional data values corresponding to the neighbor disparity data values. Thus, for each interesting pixel and per each disparity map at least two, preferably four positional data values are calculated in the 3D-space or the real world.

In yet a further preferred embodiment the positional data means is operable to estimate the combined positional data on the basis of the positional data values. As a result, the combined positional data of one single pixel or group of pixels of interest is estimated by four, preferably eight positional data values in case a multi camera system with two satellite cameras is employed. With this architecture it is secured that the amount of interpolation errors introduced by the processing of the input images is kept at a minimum.

The positional data values may be combined in a weighted manner, whereby the weights depend on the distance in—for example—image coordinates between the projection of the interesting pixel and its neighbors in the disparity maps and/or on an estimated reliability of the positional data values based on the spatial distribution of the positional data values in the 3D-space.

In a possible further embodiment the positional data means is operable and/or adapted to estimate a reliability value for each combined positional data. One possible basis for the reliability value is the spatial distribution of the positional data values in the 3D-space. The distance between these two positional data values indicates the consistency between the estimates of the camera pairs formed from main camera and first satellite camera on the one hand side and from main camera and second satellite camera on the other hand side.

In a first possible realization only one positional data value of the first positional data and only one positional data value of the second positional data are used. Another possible basis for determination of the reliability value is the position of the four, preferably eight positional data values, whereby also the distance between the data values can be evaluated.

A further subject matter of the invention is a multi camera system comprising a main camera for generating a main image and at least two satellite cameras for generating at least a first and a second satellite image, whereby the cameras can be orientated to a common observation area. The multi camera system is characterized by an apparatus as described above and/or according to one of the preceding claims.

In a preferred embodiment the main camera shows a higher resolution, a higher color depth, a higher frame rate and/or a better optical setup than the satellite cameras. One finding of this embodiment is that in special applications, for example in the movie industry, a main camera is used for taking the images, which are used later on for the final movie. The satellite cameras are only auxiliary cameras, which allow determining a depth map or a 3D-model of the observation area, especially of the observation scene. Thus, the quality of the images taken by the satellite cameras may have a lower quality than the images taken by the main camera. However, in case objects the position of which is to be determined are represented by a group of pixels in the main camera it may be sufficient to determine the position or distance of this group of pixels rather than for each individual pixel. Other possible applications of the multi camera system and/or of the apparatus can be found in the automotive area, especially to support driver assistant systems by analyzing and/or observing the surrounding of a vehicle.

A further subject matter of the invention is a method for evaluating images preferably from a multi camera system as described above/and/or according to the preceding claims and/or by using the apparatus as described above and/or according to one of the preceding claims. The method of evaluating comprises the steps:

estimating at least first disparity data concerning a pixel or a group of pixels of interest in a main image derived from the main image and a first satellite image;

estimating second disparity data concerning that pixel or group of pixels derived from the main image and a second satellite image;

estimating a combined positional data of a point in the 3D-space of an observation area corresponding to the pixel or group of pixels of interest, wherein first positional data are determined on the basis of the first disparity data and second positional data are determined on the basis of the second disparity data, and wherein the first positional data and the second positional data are combined into the combined positional data.

Further advantages, features and characteristics of the invention are disclosed by the following description and the figures as attached of a preferred embodiment of the invention. In the drawing, FIG. 1 shows a block diagram of a first embodiment of the invention;

Figure 1:
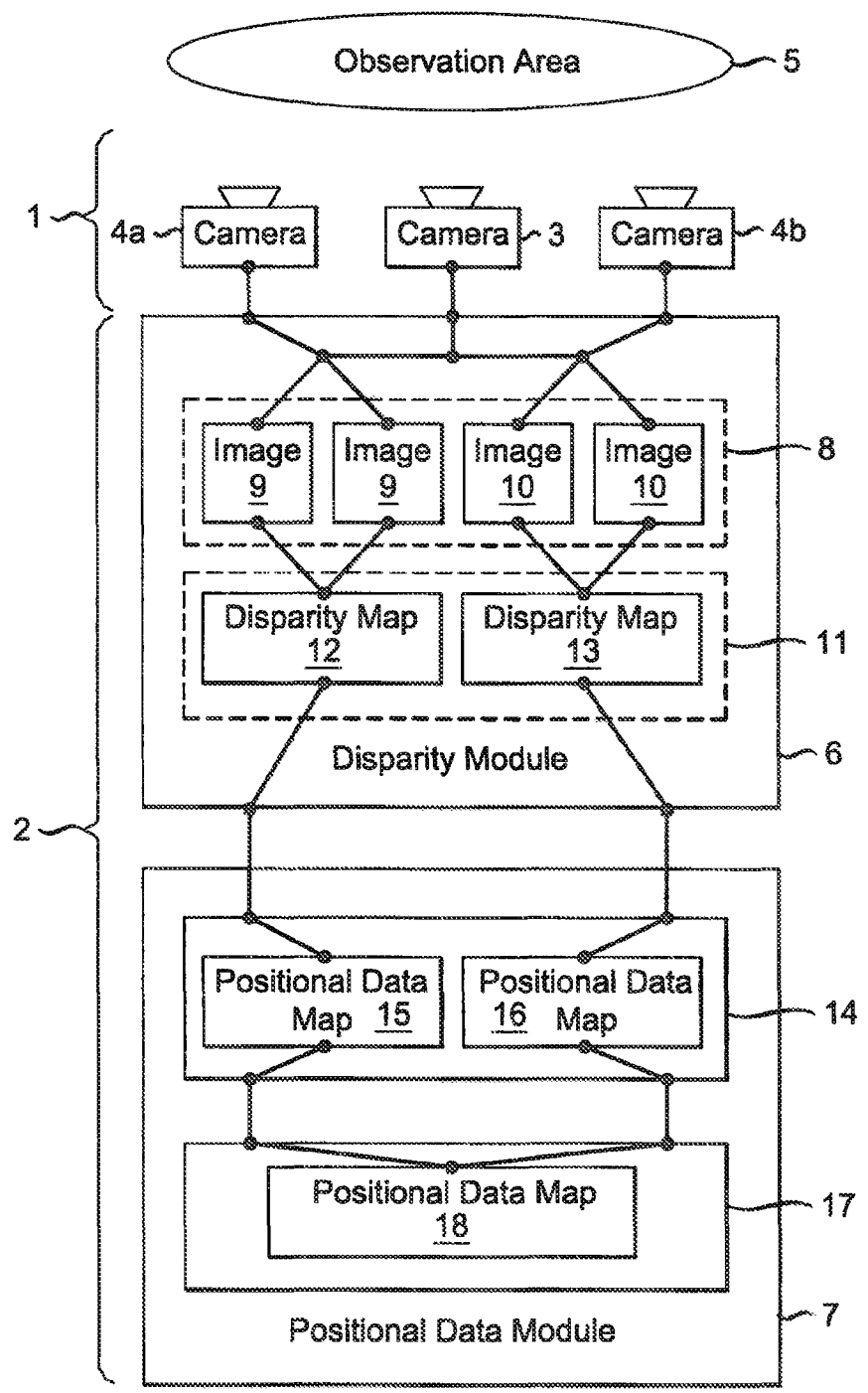

FIG. 1 shows a schematic view of multi camera system 1 coupled with an apparatus 2, which is adapted to evaluate the images from the multi camera system 1 as a first embodiment of the invention.

The multi camera system 1 comprises at least three cameras, a main camera 3 and two satellite cameras 4a and 4b. The three cameras 3, 4a, 4b may be arranged in arbitrary order but observe a common observation scene or area 5. In one special embodiment, the main camera 3 is embodied as a movie camera, the first and the second satellite camera 4a,b are realized as cameras with a lower resolution in view of the color depth, the number of pixels and/or in view of the optical setup.

The apparatus 2 comprises a disparity module 6, which is adapted to calculate a disparity map as explained below and a positional data module 7 for calculating positional data of a point in the 3D-space of the observation area 5 corresponding to an interesting pixel of a main image, resulting from the main camera 3.

The task of the apparatus 2 and the multi camera system 1 is to generate a depth map or a 3D-map for the observation area 5, so that at least one, some and/or any pixel of the main image resulting from the main camera 3 is mapped to a 3D-position of the observation area 5.

The multi camera system 1 is operable to produce at least three images, namely the main image resulting from the main camera 3, a first satellite image, resulting from the first satellite camera 4a and a second satellite image, resulting from the satellite camera 4b. These three images are applied to a rectification unit 8 being a part of the disparity module 6. In the rectification unit 8 the first satellite image and the main image are rectified to each other resulting in a first pair 9 of rectified images and the main image and the second satellite image are rectified to each other resulting in a second pair of rectified images 10. During the rectifying step the epipolar-lines of the main image and the first satellite image are adjusted parallel by a transform operation to generate the first pair of rectified images 9. The same step is processed to generate the second pair of rectified images 10. The steps of rectification for the first pair 9 and the second pair 10 of rectified images are performed separate from each other.

In a disparity unit 11 being a part of the disparity module 6 a first disparity map 12 and a second disparity map 13 are created, whereby the first disparity map 12 is created exclusively on the basis of the first pair of rectified images 9 and the second disparity map 13 is created exclusively on the basis of the second pair of rectified images 10.

The disparity maps 12 and 13 and the rectified main image 9, 10, respectively, are transferred to the positional data module 7. In a positional data unit 14 the positional data of the pixels or groups of pixels of the first rectified main image 9 and the second rectified main image 10 are calculated, thereby creating a first and a second positional data map 15, 16. It should be noted that also the positional data maps 15, 16 are calculated independently from each other. The positional data maps 15, 16 comprise positional data about the 3D-position in the observation area 5 corresponding to the pixels or groups of pixels in the rectified main images 9 and 10.

In a subsequent combining unit 17 being a part of the positional data module 7 the positional data of the positional data maps 15 and 16 are combined to a combined positional data map 18.

Optionally, a reliability value for each pixel or group of pixels of the combined positional data map 18 may be computed by evaluating the distance of the positional data corresponding to a common pixel or group of pixels of the main image.

Figure 2:
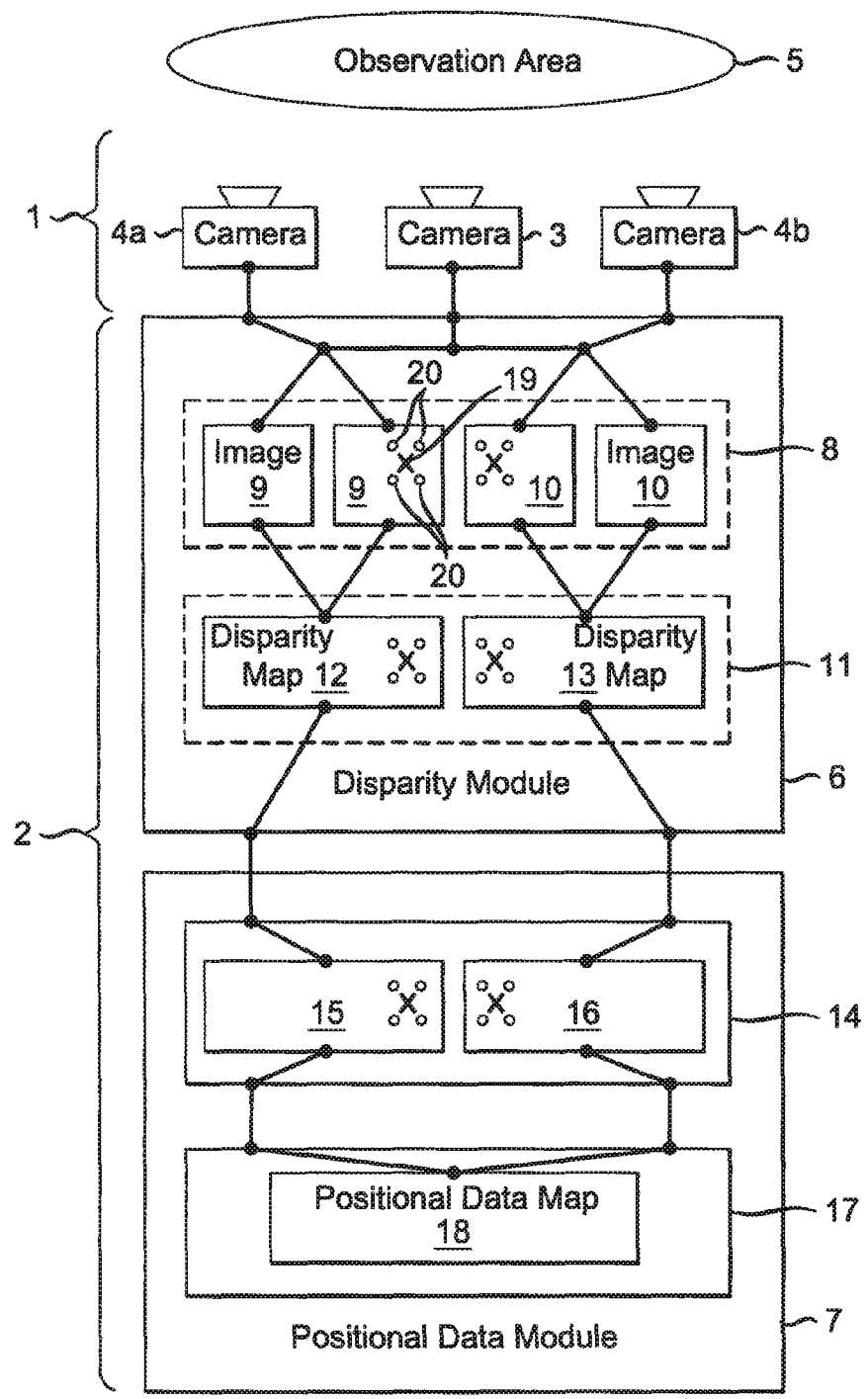
FIG. 2 shows the block diagram of FIG. 1 with more details in order to illustrate a second embodiment of the invention.

FIG. 2 shows a further embodiment of the present invention, which allows a higher accuracy and a better evaluation of the reliability values as compared to the embodiment shown in FIG. 1. Same parts of the embodiment in FIG. 2 and the embodiment in FIG. 1 are designated with the same reference numbers. As a difference to the previous embodiment the pixel or group of pixels of interest 19 in the main image resulting from the main camera 3 is not evaluated and processed as a single pixel (or group of pixels), since already the first transformation—the rectification in the rectification unit 8—leads to interpolation errors. Instead of using a single pixel or matrix value for the pixel or group of pixels of interest 19, four adjacent and/or neighboring pixels 20 are processed. The neighboring pixels 20 are pixels originating from the rectified images 9, 10 which surround the ideal, or real, position of the pixel or group of pixels of interest 19 in the rectified images 9, 10. These neighboring pixels 20 are processed by the positional data unit 14, which calculates, for each neighboring pixel 20, the 3D-positions on basis of the disparity maps 15 and 16. So—summed up—eight 3D-positions are calculated for each single pixel or group of pixels 19 of the main image from the main camera 3, which are combined by the combining unit 17 to a common 3D-position as explained below.

Figure 3:
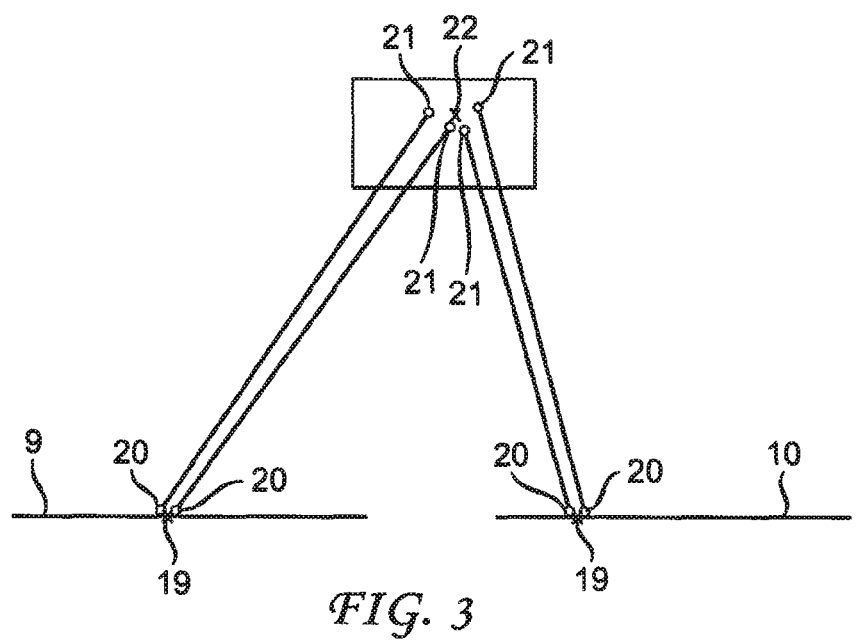
FIG. 3 shows a schematic illustration of the distribution of special pixels in the rectified images and the 3D-space according to the second embodiment of the invention.
Figure 4:
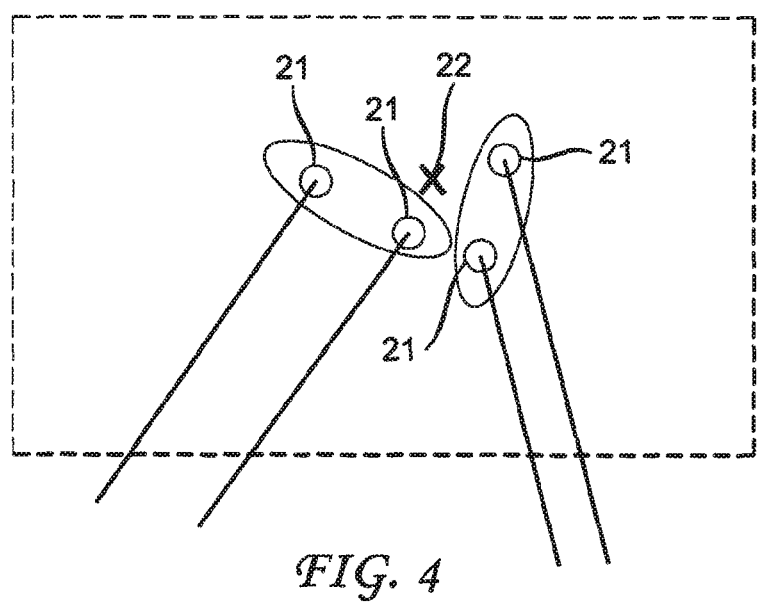
FIG. 4 shows a detail from the FIG. 3.

FIG. 3 shows a view from the top of two rectified images 9, 10 for the main camera 3, and represents the distance of the 3D point or group of 3D points to the camera and the horizontal position, or X- and Z-direction, rather than the position of the pixel or group of pixels within the image sensor's matrix of lines and columns, or X- and Y-direction. The pixel or group of pixels or interest 19 is surrounded by two neighboring pixels 20 in each rectified image 9, 10. It shall be noted that only 2×2 of the 2×4 neighboring pixels 20 are shown in FIG. 4 due to the top view presentation; the corresponding Y-direction lies perpendicular to the surface of the drawing sheet. Each neighboring pixel 20 can be projected with the help of the first and second disparity map 12, 13, respectively, to their 3D-position in the observation area 5, so that four 3D-positions 21 in the 3D-space of the observation area 5 are calculated. It shall be noted that in fact eight 3D-positions 21 are estimated.

FIG. 4 shows a detail of the observation area 5 in FIG. 3, illustrating the 3D-positions 21 of the neighboring pixels 20 and the 3D-position 22 of the ideal pixel position 19. The evaluation of the plurality of 3D-positions 21 of the neighboring pixels 20 can be computed in different ways: In a simple implementation, an average value of the eight 3D-positions 21 is calculated. The same limitation as to the reproduction of the Y-direction as mentioned for FIG. 3 applies.

In more sophisticated implementations a weighted average can be used, whereby the weight may be dependent from (i) —the spatial distribution—the distance in image coordinates between the ideal position 19 of the pixel or group of pixels of interest and the respective neighboring pixels or groups of pixels 20 in the rectified images 9, 10 of the main camera 3 (or an equivalent thereof) and/or (ii) —the confidence—the estimated reliability of the distance associated with the respective pixel or group of pixels 20 for example derived when calculating the disparity data and/or (iii) —the consistence—the distance between the 3D-positions, optionally also in order to eliminate inconsistent outliers.

In yet a further implementation the following steps are proposed: Defining sub-clusters with the 3D-positions of the neighbouring pixel or group of pixels 20, whereby each sub-cluster comprises 3D-positions resulting only from one disparity map 15 or 16. Calculating of an optionally weighted centre of mass and of the corresponding standard deviation for each sub-cluster. Optionally elimination of outliers or blips, for example elimination of pixels or group of pixels 20 with 3D-positions having a distance to the centre of mass which is larger than three times of the standard deviation (three sigma test). Recalculating the centre of mass and standard deviation of the remaining pixels or group of pixels 20 of the sub-clusters. Weighted fusion of the centre of masses of the sub-classes for example weighted under consideration of the corresponding standard deviations. Optionally using the standard deviation and/or the weights as used for defining the reliability value. One finding of this implementation is that an inconsistency of the positional data values of one pixel or group of pixels of interest is often based on the inconsistency of the positional data values of different camera pairs, and thus of different disparity maps, and not based on the inconsistency of the positional data values of one disparity map. By the fusion of the centre of masses resulting from different camera pairs and/or different disparity maps, centre of masses, which are not reliable are considered with a lesser weight.

Optionally, a reliability measure for each of these distance estimates, i.e. the combined positional data, is determined. It does not only depend on individual reliability estimates for each positional data, but also on the distance between the 3D-points of the positional data values or the centre of mass of different sub-clusters as explained below for one point of interest. This distance is a measure for the consistency of the different estimates—mainly between the different camera pairs but also within one camera pair. A large distance indicates a mismatch so that the reliability estimate is decreased accordingly.

In a further development of the invention, the consistency of the positional data values and/or the reliability value is considered or weighted in respect to the distance of the point in 3D-space to the camera or cameras. In general and due to optical reasons, the inconsistency should decrease along with the distance. Thus a limit of allowable inconsistency should also decrease with the distance. On the other hand it must be respected that in small distances distortions arise due to perspective effects. Thus the curve progression of a curve concerning the allowable inconsistency vs. the camera distance should increase again below a pre-defined camera distance.

As a consequence, the proposed approach does not only produce a combined distance map that is more accurate but the reliability of every distance is estimated, too. This additional information is very valuable in its own right as e.g. some applications may need sparse, but highly reliable and accurate distance estimates. Furthermore, this information may be advantageously be used during a subsequent post-processing step. Disparity estimation is intrinsically difficult at object borders due to the resulting occlusions. Therefore, distance maps are commonly refined using segmentation information. During this process, the reliability estimates provide additional information for the performed smoothing and interpolation.

Finally and in a further possible implementation, the computational requirements many be reduced by avoiding the combination of the neighbouring distance estimates in the combining unit 17, as detailed above. The nearest neighbour to the ideal position of the pixel or group of pixels of interest may simply be used instead, without too much performance degradation.

The invention advantageously reduces the number of transformations required during rectification of images and consequently reduces errors introduced by interpolation.

The invention claimed is:

1. Apparatus for evaluating correlated images originating from a multi camera system, the correlated images at least partly covering the same 3-D observation area captured from respective different viewing positions, the correlated images comprising a main image and at least a first and a second satellite image, wherein the apparatus is operable to estimate combined positional data of a point in the 3D-space of the observation area corresponding to at least one pixel of interest of the main image, the apparatus comprising:
   first disparity means for estimating at least first disparity data concerning the at least one pixel of interest derived from the main image and the first satellite image,
   second disparity means for estimating at least second disparity data concerning the at least one pixel of interest derived from the main image and the second satellite image,
   positional data means for estimating the combined positional data of the point in the 3D-space of the observation area corresponding to the at least one pixel of interest in the main image,
   wherein the positional data means is operable to estimate first positional data on basis of the first disparity data and second positional data on basis of the second disparity data, wherein the positional data means is operable to assign a reliability value to each of the first and the second positional data, wherein the reliability values for the first and the second positional data are based on a spatial distribution of the positional data values in the 3D-space, and wherein the positional data means is operable to combine the first positional data and the second positional data to the combined positional data in accordance with the respective reliability values for the first and the second positional data.

2. Apparatus according to claim 1, further including rectification means for performing a rectification of the main image with respect to the first satellite image and/or of the main image with respect to the second satellite image, and/or vice versa.

3. Apparatus according to claim 1, wherein each of the first and/or the second disparity data comprises at least two neighbor disparity data values for each observation area corresponding to the at least one pixel of interest in the main image.

4. Apparatus according to claim 1, wherein the at least two neighbor disparity data values are values of the disparity map located adjacent to an ideal position of the at least one pixel of interest in the disparity map.

5. Apparatus according to claim 1, wherein each of the first and/or the second positional data comprises at least two positional data values corresponding to the at least two neighbor disparity data values.

6. Apparatus according to claim 5, wherein the positional data means is operable to estimate the combined positional data on the basis of the positional data values.

7. Apparatus according to claim 1, wherein the positional data means is operable to estimate a reliability value for each combined positional data.

8. Apparatus according to claim 7, wherein the reliability value is estimated by evaluating the spatial distribution of positional data values in the 3D-space.

9. Apparatus according to claim 8, wherein the reliability value is estimated by evaluating the distance between an ideal position of the at least one pixel of interest and the location of neighbor disparity data values in the disparity map and/or in the rectified images and/or in the 3D-space.

10. Apparatus according to claim 7, wherein the reliability value is estimated by evaluating the distance between an ideal position of the at least one pixel of interest and the location of neighbor disparity data values in the disparity map and/or in the rectified images and/or in the 3D-space.

11. Multi camera system comprising a main camera for generating a main image and at least two satellite cameras for generating at least a first and a second satellite image, wherein the cameras can be orientated to a common observation area, the multi camera system further being characterized by an apparatus according to claim 1.

12. Multi camera system according to claim 11, wherein the main camera shows a higher resolution, a higher color depth, a higher frame rate and/or a better optical set-up than the satellite cameras.

13. A method comprising the steps of:
   estimating at least first disparity data concerning an observation area corresponding to at least one pixel of interest in a main image, derived from the main image and a first satellite image;
   estimating second disparity data concerning the observation area corresponding to at least one pixel of interest, derived from the main image and a second satellite image;
   estimating a combined positional data of a point in the 3D-space of the observation area corresponding to at least one pixel of interest, wherein first positional data are estimated on the basis of the first disparity data and second positional data are estimated on the basis of the second disparity data, wherein a reliability value is assigned to each of the first and second positional data, wherein the reliability values for the first and the second positional data are based on a spatial distribution of the positional data values in the 3D-space, wherein the first positional data and the second positional data are combined into the combined positional data in accordance with the respective reliability values for the first and the second positional data.

14. The method of claim 13, further comprising providing, for each of the first and/or the second disparity data, at least two neighbor disparity data values for the observation area corresponding to the at least one pixels of interest in the main image.

* * * * *